United States Patent
Shin et al.

(10) Patent No.: US 9,466,267 B2
(45) Date of Patent: Oct. 11, 2016

(54) METHOD AND APPARATUS FOR OUTPUTTING SCREEN IMAGE IN ELECTRONIC DEVICE

(71) Applicant: Samsung Electronics Co., Ltd., Suwon-si, Gyeonggi-do (KR)

(72) Inventors: Sangmin Shin, Osan-si (KR); Jin Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 197 days.

(21) Appl. No.: 14/293,316

(22) Filed: Jun. 2, 2014

(65) Prior Publication Data
US 2014/0375677 A1    Dec. 25, 2014

(30) Foreign Application Priority Data

Jun. 25, 2013  (KR) .................... 10-2013-0073017

(51) Int. Cl.
| | | |
|---|---|---|
| G06F 3/048 | (2013.01) | |
| G09G 5/377 | (2006.01) | |
| G09G 3/00 | (2006.01) | |
| G06F 3/041 | (2006.01) | |

(52) U.S. Cl.
CPC .............. *G09G 5/377* (2013.01); *G06F 3/041* (2013.01); *G09G 3/002* (2013.01); *G09G 2340/00* (2013.01); *G09G 2354/00* (2013.01)

(58) Field of Classification Search
None
See application file for complete search history.

(56) References Cited

U.S. PATENT DOCUMENTS

| | | | | |
|---|---|---|---|---|
| 8,322,863 B1* | 12/2012 | Cho | ..................... | H04N 9/3194 353/70 |
| 2002/0140727 A1* | 10/2002 | Lindholm | ............. | G06F 3/0481 715/744 |
| 2003/0080972 A1* | 5/2003 | Gerstner | ............... | G06F 3/0485 345/619 |
| 2003/0146934 A1* | 8/2003 | Bailey | ....................... | G06F 8/38 715/765 |
| 2007/0046654 A1* | 3/2007 | Tomiya | ................... | G06F 3/043 345/179 |
| 2007/0192726 A1 | 8/2007 | Kim et al. | | |
| 2008/0074444 A1* | 3/2008 | Morikawa | .............. | G09G 5/005 345/660 |
| 2008/0284987 A1* | 11/2008 | Yonezawa | .............. | G03B 21/00 353/70 |
| 2009/0199120 A1* | 8/2009 | Baxter | .................. | G06F 3/0482 715/765 |
| 2011/0154249 A1* | 6/2011 | Jang | ........................ | G06F 3/017 715/781 |
| 2011/0181553 A1* | 7/2011 | Brown | .................. | G06F 3/0425 345/175 |
| 2012/0019433 A1* | 1/2012 | Inagaki | ................. | G06F 3/1454 345/1.1 |
| 2012/0092705 A1 | 4/2012 | Min et al. | | |
| 2012/0182307 A1 | 7/2012 | Ueno et al. | | |
| 2012/0182531 A1* | 7/2012 | Ueno | ..................... | G03B 21/00 353/85 |
| 2013/0227468 A1* | 8/2013 | Wu | ....................... | G06F 3/0488 715/786 |
| 2014/0002389 A1* | 1/2014 | Kim | ..................... | G06F 3/1446 345/173 |

\* cited by examiner

*Primary Examiner* — David H Chu
(74) *Attorney, Agent, or Firm* — Jefferson IP Law, LLP

(57) ABSTRACT

A method of outputting a screen image in an electronic device is provided. The method includes outputting a screen image of an electronic device as a projected screen image through a projector when a projector application is executed, measuring a distance between the electronic device and the projected screen image, generating a combined screen image by setting the number of screen images to be displayed according to the measured distance, and then outputting the combined screen image on the projected screen image through the projector.

15 Claims, 14 Drawing Sheets

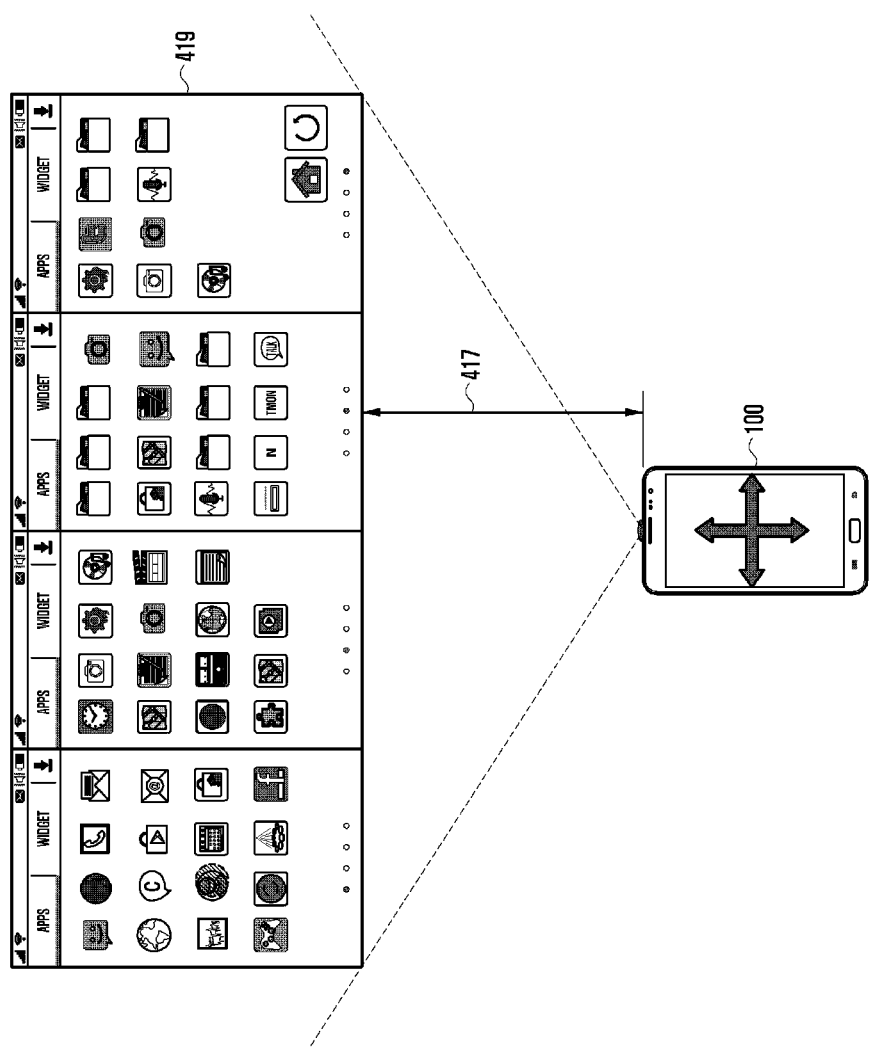

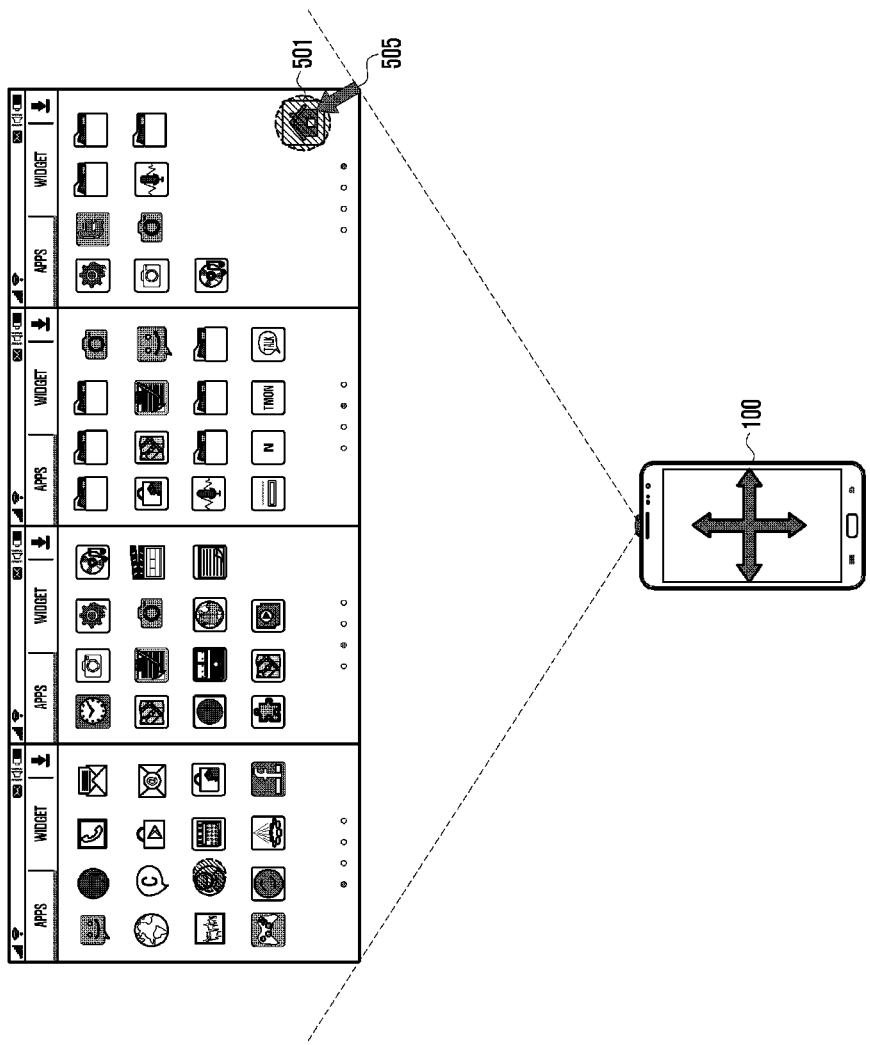

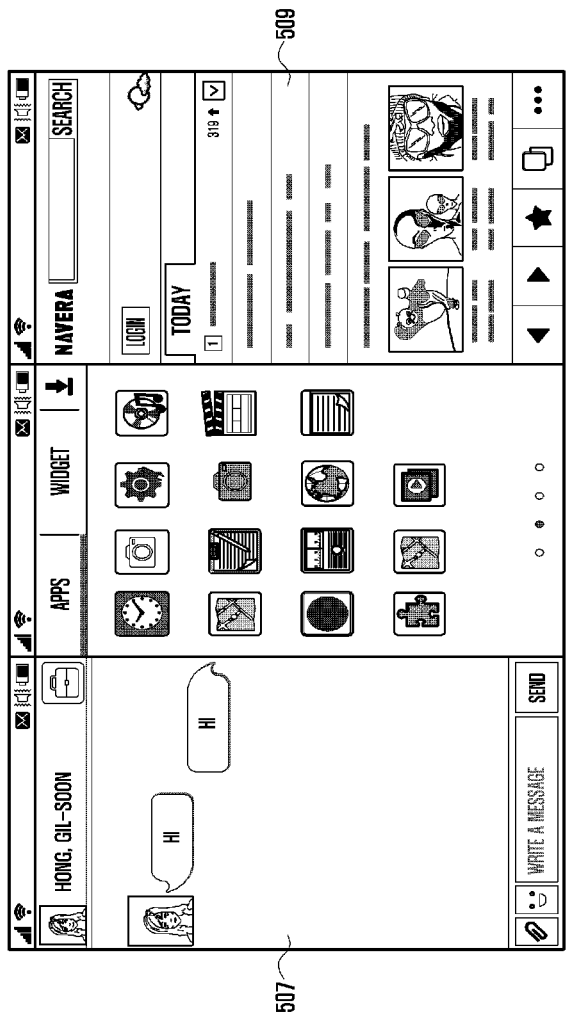

METHOD AND APPARATUS FOR OUTPUTTING SCREEN IMAGE IN ELECTRONIC DEVICE

CROSS-REFERENCE TO RELATED APPLICATION(S)

This application claims the benefit under 35 U.S.C. §119 (a) of a Korean patent application filed on Jun. 25, 2013 in the Korean Intellectual Property Office and assigned Serial number 10-2013-0073017, the entire disclosure of which is hereby incorporated by reference.

TECHNICAL FIELD

The present disclosure relates to a method and an apparatus for outputting a screen image in an electronic device. More particularly, the present disclosure relates to a method and an apparatus for outputting a beam projector image.

BACKGROUND

Currently, use of electronic devices (e.g., a smart phone, a Personal Digital Assistant (PDA), and a table Personal Computer (PC)) has been generalized. The electronic devices provide various functions, such as photographing of a picture or a video, reproduction of a music file or a video file, game play, reception of broadcasting, and wireless Internet.

In the meantime, the electronic device may include a beam projector. The electronic device may project a screen image executed in the electronic device (e.g., a home screen image, an application screen image, a music and video reproduction screen image, and an Internet screen image) onto an external screen, a wall surface, a paper, and the like spaced apart from the electronic device by a predetermined distance and output the screen image in a form of an enlarged screen image.

According to the related art, an electronic device including the beam projector performs mirroring on the screen image of the electronic device and outputs the mirrored screen image on a projected screen image. The screen image output through the beam projector includes only one screen image, so that there is inconvenience in that screen images need to be frequently moved in home screen images and/or application screen images including a plurality of screen images when the screen image is moved.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and an apparatus for outputting a screen image supporting a plurality of screen images to be output on a projected screen image by combining the plurality of screen images when activating a function of a beam projector by an electronic device. In this case, the electronic device may control the projected screen image output by performing a function of a touch pad.

The present disclosure has been proposed to solve the above-mentioned problems, and provides a method and an apparatus for outputting a screen image capable of adjusting the number of screen images in proportion to a distance between an electronic device and a projected screen image and outputting the screen images in a form of a combined screen image by the electronic device.

In accordance with an aspect of the present disclosure, a method of outputting a screen image in an electronic device is provided. The method includes outputting a screen image of an electronic device as a projected screen image through a projector when a projector application is executed, measuring a distance between the electronic device and the projected screen image, generating a combined screen image by setting the number of screen images to be displayed according to the measured distance, and then outputting the combined screen image on the projected screen image through the projector.

In accordance with another aspect of the present disclosure, an apparatus for outputting a screen image in an electronic device is provided. The apparatus includes a projector configured to output a screen image supported by the electronic device on a projected screen image, a touch panel driven as a touch pad generating a touch input for controlling the output combined screen image, and a controller configured to control the screen image of the electronic device to be output on a projected screen image through the projector when a projector application is executed, measure a distance between the electronic device and the projected screen image, and set the number of screen images to be displayed according to the measured distance and control the set number of screen images to be output as a combined screen image on the projected screen image.

The electronic device according to various embodiments of the present disclosure outputs a plurality of screen images (e.g., application screen images and/or home screen images) supported by the electronic device as a combined screen image on a projected screen image when a function of a beam projector is activated, thereby providing the same working environment as that of a computer and thus improving convenience of a user. Further, the present disclosure flexibly displays a screen image in proportion to a distance between an electronic device and a projected screen image, thereby supporting a user interface optimized to various situations and environments of a user.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description in conjunction with the accompanying drawings, in which:

FIGS. 4A, 4B, 4C, and 4D are diagrams of an example for describing a method of displaying a combined screen image according to a change in a size of a projected screen image according to various embodiment of the present disclosure; and FIGS. 5A, 5B, 5C, 5D, 5E, 5F, and 5G are diagrams of an example for describing a method of performing a function in response to a touch input according to various embodiment of the present disclosure.

Throughout the drawings, it should be noted that like reference numbers are used to depict the same or similar elements, features, and structures.

DETAILED DESCRIPTION

Figure 1:
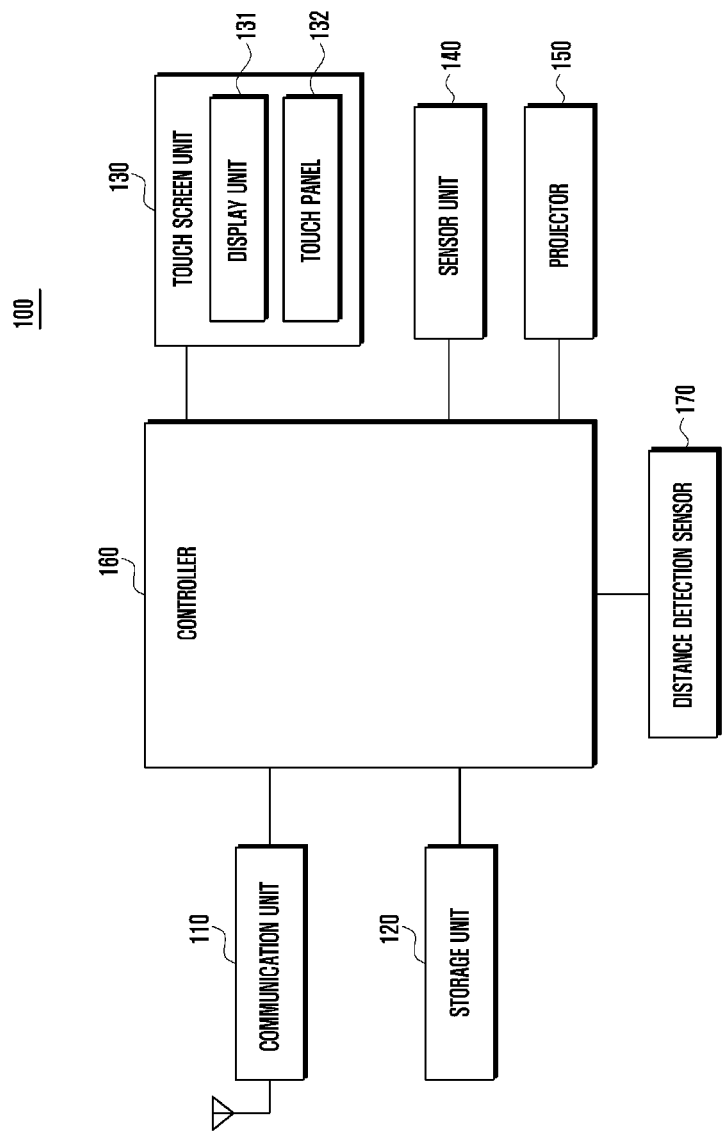
FIG. 1 is a block diagram illustrating a configuration of an electronic device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Meanwhile, various embodiments of the present disclosure shown and described in this specification and the drawings correspond to specific examples presented in order to easily explain technical contents of the present disclosure, and to help comprehension of the present disclosure, but are not intended to limit the scope of the present disclosure. In addition to the various embodiments of the present disclosure described herein, modifications may be made to the various embodiments described herein on the basis of the spirit of the present can be carried out.

According to various embodiments of the present disclosure, an electronic device may include communication functionality. For example, an electronic device may be a smart phone, a tablet Personal Computer (PC), a mobile phone, a video phone, an e-book reader, a desktop PC, a laptop PC, a netbook PC, a Personal Digital Assistant (PDA), a Portable Multimedia Player (PMP), an mp3 player, a mobile medical device, a camera, a wearable device (e.g., a Head-Mounted Device (HMD), electronic clothes, electronic braces, an electronic necklace, an electronic appcessory, an electronic tattoo, or a smart watch), and/or the like.

According to various embodiments of the present disclosure, an electronic device may be a smart home appliance with communication functionality. A smart home appliance may be, for example, a television, a Digital Video Disk (DVD) player, an audio, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, and/or the like.

According to various embodiments of the present disclosure, an electronic device may be a medical device (e.g., Magnetic Resonance Angiography (MRA) device, a Magnetic Resonance Imaging (MRI) device, Computed Tomography (CT) device, an imaging device, or an ultrasonic device), a navigation device, a Global Positioning System (GPS) receiver, an Event Data Recorder (EDR), a Flight Data Recorder (FDR), an automotive infotainment device, a naval electronic device (e.g., naval navigation device, gyroscope, or compass), an avionic electronic device, a security device, an industrial or consumer robot, and/or the like.

According to various embodiments of the present disclosure, an electronic device may be furniture, part of a building/structure, an electronic board, electronic signature receiving device, a projector, various measuring devices (e.g., water, electricity, gas or electro-magnetic wave measuring devices), and/or the like that include communication functionality.

According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

According to various embodiments of the present disclosure, "a screen image" is one screen image displayed on one screen of an electronic device and corresponds to a screen image displayed on a display unit of the electronic device. For example, a home screen image and/or an application screen image may be formed of one or more screen images, and the screen may include a plurality of screen images. For example, the home screen image and/or the application screen image may be displayed by enumerating application icons, widget icons, folders, and/or the like, the number of screen images in the electronic device may be generated to be plural according to a user.

Further, according to various embodiments of the present disclosure, a "combined screen image" may be used as a term for a combined screen image of a plurality of screen images supported to be displayed on a projected screen image by the electronic device when a function of a beam projector is activated.

Further, according to various embodiments of the present disclosure, "screen image movement" may be used as a term for indicating a display of a screen image connected to a home screen image and/or an application screen image. For example, it is assumed that only two screen images are combined and displayed on a projected screen image in proportion to a distance in an electronic device including a total of 4 application screen images. In this case, when a touch input for the screen image movement is generated, the electronic device may combine one or two non-displayed screen images and display the combined one or two screen images on a projected screen image. For example, one screen image or the entire combined screen image may move through the screen image movement.

Further, according to various embodiments of the present disclosure, a "screen image change" may be used as a term for indicating a change in a screen image from an application screen image to a home screen image or a change from a home screen image to an application screen image and a display of the changed screen image.

Further, according to various embodiments of the present disclosure, the "projected screen image" may be used as a term for defining a screen image output by projecting a screen image executed in the electronic device when a function of a beam projector is activated onto an object (e.g., an external screen and a wall surface) located a predetermined distance away from the electronic device.

According to various embodiments of the present disclosure, an electronic device may be an electronic device. For example, the electronic device may include various types of terminals to which a function of a beam projector is applicable. According to various embodiments of the present disclosure, the electronic device may be equally applied in an environment in which the terminal is connected to another terminal, such as a Television (TV) (e.g., an N screen environment).

FIG. 1 is a block diagram illustrating a configuration of an electronic device according to an embodiment of the present disclosure.

Referring to FIG. 1, the electronic device 100 of the present disclosure may include a communication unit 110, a storage unit 120, a touch screen unit 130, a sensor unit 140, a projector 150, a controller 160, and a distance detection sensor 170.

The communication unit 110 may perform voice call, video call, or data communication with an external device through a network. The communication unit 110 may include an RF transmitter up-converting and amplifying a frequency of a transmitted signal, an RF receiver low-noise amplifying a received signal and down-converting a frequency, and the like. Further, the communication unit 110 may include a modulator and a demodulator. The modulator and a demodulator may serve a communication scheme, such as Code Division Multiple Access (CDMA), Wideband Code Division Multiple Access (WCDMA), Long Term Evolution (LTE), Wi-Fi, Wireless Broadband Internet (WI-BRO), Bluetooth, Near Field Communication (NFC), Infrared Data Association (IrDA) communication, and/or the like. The communication unit 110 may include a mobile communication module, an Internet communication module, a near field communication module, and/or the like.

The storage unit 120 may include a program memory storing an operation program of an electronic device and a data memory storing data generated during performance of a program.

The touch screen unit 130 may be integrally formed with a display unit 131 and a touch panel 132. The display unit 131 may display various screen images according to use of the electronic device under control of the controller 160. The display unit 131 may be formed of a Liquid Crystal Display (LCD), an Organic Light Emitted Diode (OLED), an Active Matrix Organic Light Emitted Diode (AMOLED), and/or the like. The touch panel 132 may be a complex touch panel including a hand touch panel detecting a gesture of a hand and a pen touch panel detecting a gesture of a pen. According to various embodiments of the present disclosure, the touch panel 132 may perform a touch pad function of controlling a projected screen image output as a combined screen image when the function of the projector is activated. The display unit 131 may provide an arrow-shaped indicator controlling the projected screen image.

The sensor unit 140 detects a state of the electronic device. The sensor unit 140 may include an acceleration sensor, a geomagnetic sensor, a gyro sensor, and/or the like. The sensor unit 140 may detect a movement and/or a rotation state of the electronic device.

The projector 150 is a device projecting a slide, a video image, and/or the like onto a screen by using light. According to various embodiments of the present disclosure, the projector 150 may project a screen image (e.g., a home screen image, an application screen image, an application execution screen image, and/or the like) of the electronic device onto an object (e.g., an external screen, a wall surface, and/or the like) located a predetermined distance away from the electronic device. According to various embodiments of the present disclosure, the projector 150 may output a plurality of screen images as a combined screen image.

The controller 160 controls a general operation of the electronic device and a signal flow between internal elements of the electronic device, performs a function of processing data, controls power supply from a battery to the elements, and/or the like. According to various embodiment of the present disclosure, the controller 160 may detect execution of a projector application. Further, the controller 160 may measure a distance between the electronic device 100 and the projected screen image by analyzing an output of the sensor unit 140 while driving the projector 150, and makes a control so that the number of screen images of the combined screen image displayed as the projected screen image is adjusted and displayed in proportion to the measured distance. In this case, the controller 160 may control a cursor to be displayed on the projected screen image, and the touch panel 132 may perform the touch pad function controlling the projected screen image. Next, the controller 160 may detect directionality of a touch movement through the touch panel 132, and control an operation (e.g., a screen movement and execution of an application) of the cursor on the projected screen image in response to the detected direction.

The distance detection sensor 170 may be a sensor for measuring a distance between a projected and output screen image of the projector 150 and the electronic device. The distance detection sensor 170 may be a laser, an infrared ray sensor, and/or the like. Hereinafter, it is assumed that the distance detection sensor 170 is an infrared ray sensor. The infrared ray sensor may include a light emission unit that emits light of a predetermined frequency and a light reception unit for receiving light emitted from the light emission unit. The distance detection sensor 170 may measure a distance by detecting light of infrared rays generated in the light emission unit and reflected from an object (e.g., the external screen and the wall surface) by the light reception unit. According to various embodiments of the present disclosure, the infrared ray sensor may measure a distance between the electronic device 100 and the projected screen image under control of the controller 160.

In addition, the electronic device 100 may selectively further include elements having additional functions, such as a Global Positioning System (GPS) module for receiving position information, an audio processor including a microphone and a speaker, a camera module for photographing a static image and a moving image of a subject, an input unit for supporting an input based on a hard key, and/or the like. However, descriptions and illustrations thereof will be omitted.

Figure 2:
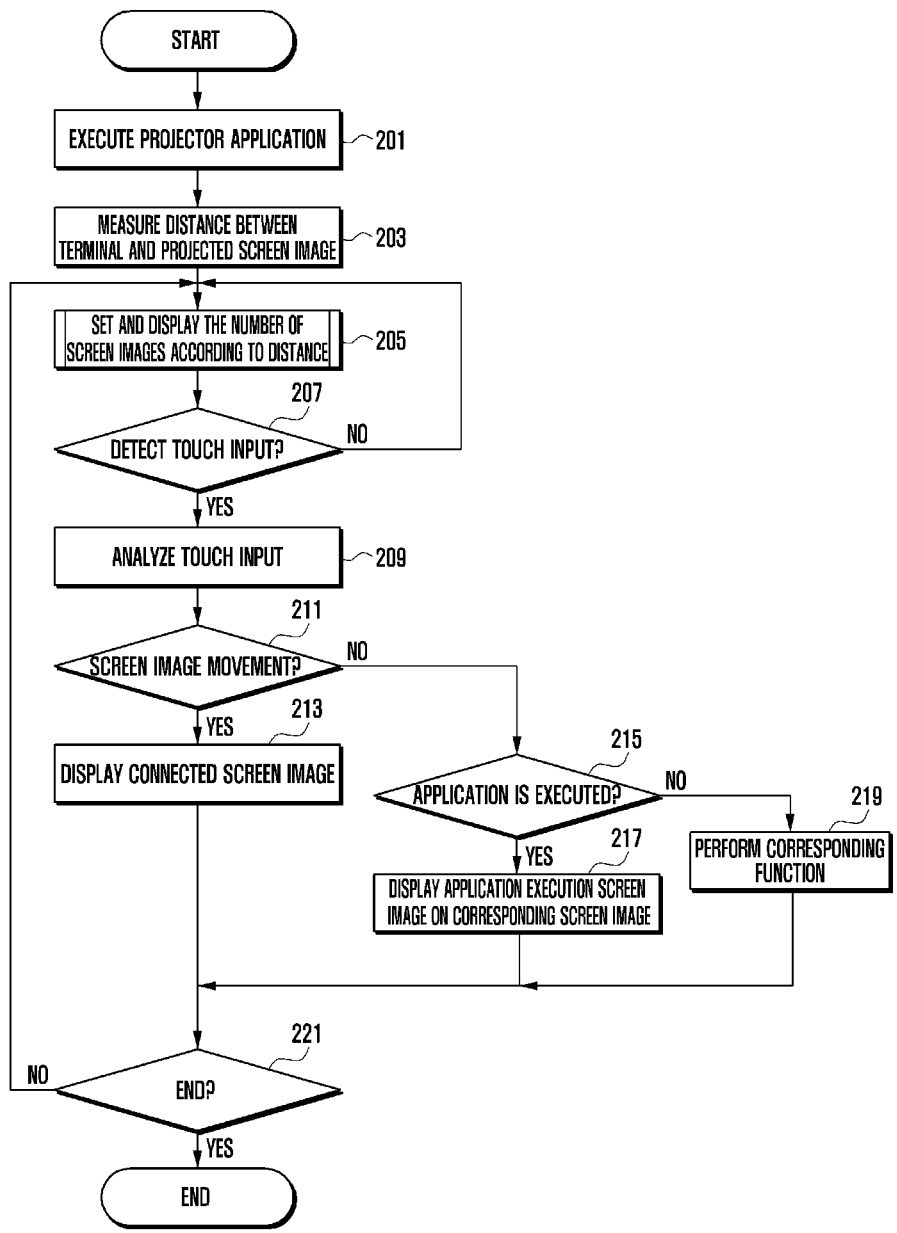
FIG. 2 is a flowchart illustrating a method of displaying and controlling a combined screen image on a projected screen image according to an embodiment of the present disclosure.

FIG. 2 is a flowchart illustrating a method of displaying and controlling a combined screen image on a projected screen image according to an embodiment of the present disclosure.

Referring to FIG. 2, at operation 201, the controller executes a projector application. For example, when a user instructs driving of the projector 150, the controller 160 may detect execution of a projector application. The controller 160 may control a plurality of screen images (e.g., home screen images or application screen images) supported by the electronic device 100 to be combined and displayed (e.g., displayed as a combined screen image) on a projected screen image according to the execution of the projector application. In this case, the controller 160 may not display the screen image on the display unit 131, and controls the touch panel 132 so as to be operated as a touch pad for controlling an operation of the combined screen image. Further, the controller 160 may also display an image of the combined screen image or a specific screen image (e.g., a screen image located at a center of the combined screen image) in the combined screen image on the display unit 131. Further, the controller 160 may control a cursor for controlling (e.g., a screen image movement and execution of an application) the combined screen image output on the projected screen image to be displayed. Further, the controller 160 may detect directionality of a touch movement through the touch panel 132 and control an operation of the cursor in response to the detected direction.

At operation 203, the controller 160 may measure a distance between the electronic device 100 and the projected screen image. For example, the controller 160 may measure a distance between the electronic device 100 and the projected screen image by analyzing a signal detected by the distance detection sensor 170 of the sensor unit 140 and detect a change in a size of the projected screen image according to the measured distance. The distance detection sensor 170 may be an infrared ray sensor, or the like. The infrared ray sensor may include a light emission unit that emits light of a predetermined frequency and a light reception unit for receiving light that is emitted from the light emission unit. A method of measuring a distance by using the infrared ray sensor is a method of measuring according to the amount of infrared rays, and may measure a distance by detecting light of infrared rays generated in the light emission unit and reflected from an object (e.g., the external screen and the wall surface) by the light reception unit.

At operation 205, the controller 160 may set and display the number of screen images according to the measured distance. For example, the controller 160 may control the combined screen image to be output on the projected screen image by adjusting the number of screen images outputtable in proportion to the changed size of the projected screen image in.

A detailed operation of operation 205 of FIG. 2 will be described in detail with reference to FIGS. 3 and 4A to 4D.

Figure 3:
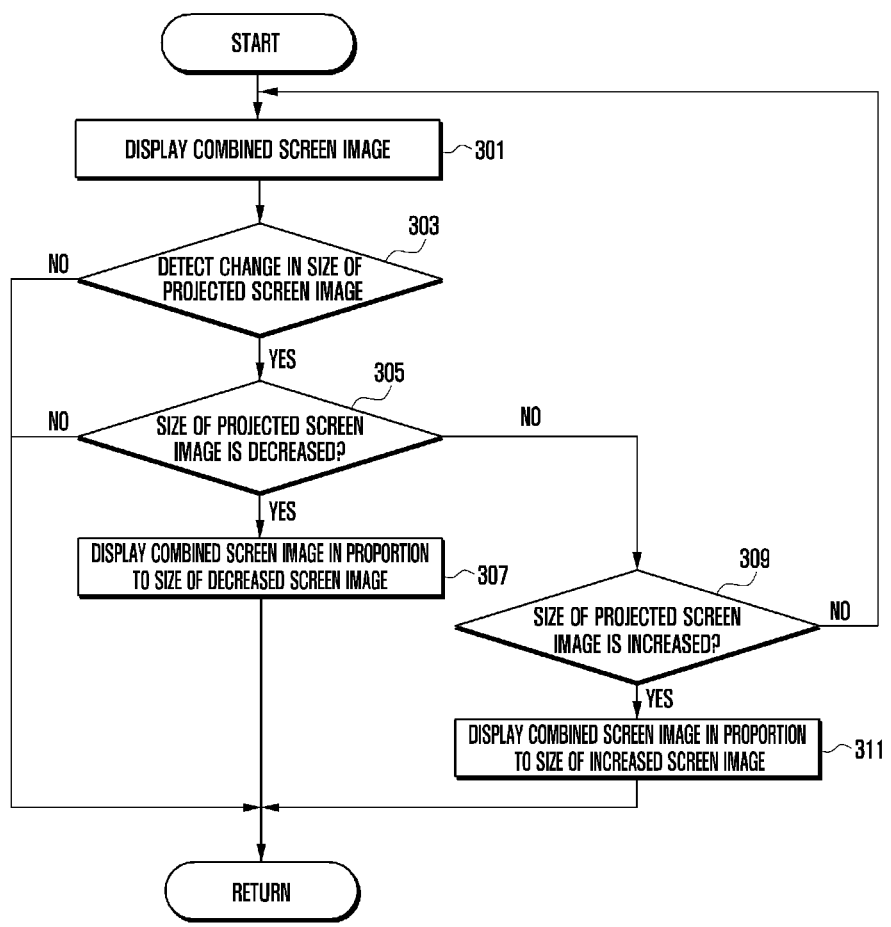
FIG. 3 is a flowchart illustrating a method of displaying a screen image according to a change in a size of a projected screen image according to an embodiment of the present disclosure.

FIG. 3 is a flowchart illustrating a method of displaying a screen image according to a change in a size of a projected screen image according to an embodiment of the present disclosure. FIGS. 4A, 4B, 4C, and 4D are diagrams of an example for describing a method of displaying a combined screen image according to a change in a size of a projected screen image according to various embodiment of the present disclosure.

Referring to FIGS. 3, 4A, 4B, 4C, and 4D, at operation 301, the controller 160 may display a combined screen image. For example, the controller 160 may control the number of screen images outputtable in proportion to the changed size of the projected screen image to be set, and the set screen images to be combined and displayed. The screen image includes a home screen image and/or an application screen image. In this case, the controller 160 may control a screen image movement icon and/or a screen image change icon to be displayed on the projected combined screen image through the projector 150.

Figure 4A:
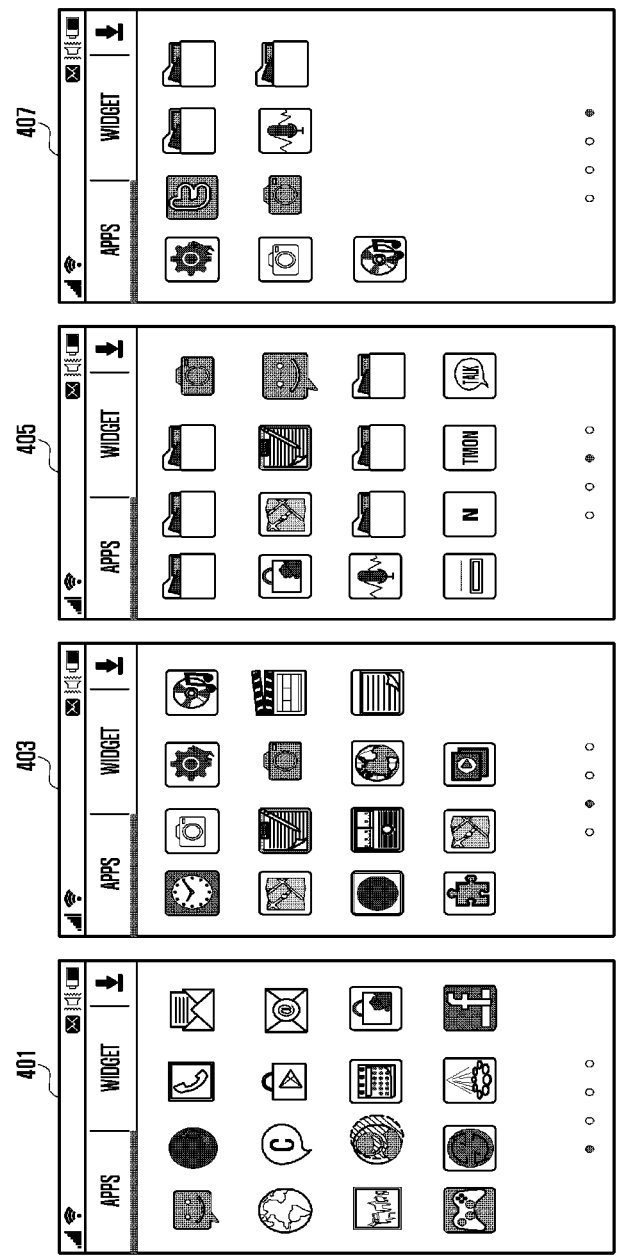
Figure 4B:
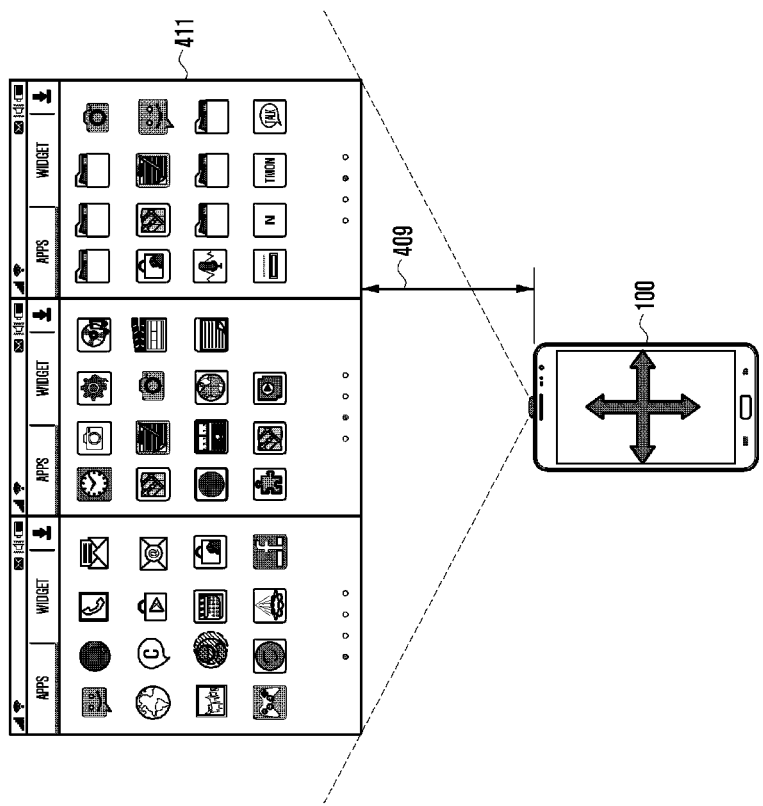

For example, as illustrated in FIG. 4A, the application screen images supported by the electronic device 100 may include four screen images (e.g., screen image 1 401, screen image 2 403, screen image 3 405, and screen image 4 407). The respective screen images may be combined and output on the projected screen image while the projector application is executed. The number of screen images displayed on the projected screen image among the four application screen images may be adjusted and displayed in proportion to a distance between the electronic device 100 and the projected screen image. For example, when a size of the projected screen image at distance 409 of FIG. 4B is a size corresponding to reference numeral 411 of FIG. 4B, the controller 160 may set the three screen images 401, 403, and 405 to be combined and displayed in proportion to the size corresponding to reference numeral 411 of FIG. 4B to output the combined screen image.

Next, the controller 160 may detect a movement of the electronic device 100 through the sensor unit 140. When the movement of the electronic device 100 is generated, a distance between the electronic device 100 and the projected screen image may be determined to be changed. Whether the size of the projected screen image is changed may be determined according to the change in the distance.

At operation 303, the controller 160 may determine whether a change in a size of the projected screen image is detected. For example, when the size of the projected screen image is changed, the controller 160 may detect the change in the size of the projected screen image. Thereafter, the controller 160 may determine whether to decrease or increase the size of the projected screen image.

If the controller 160 determines that a change in the size of the projected screen is not detected at operation 303, then the controller 160 may return to and perform operation 207.

If the controller 160 determines that a change in the size of the projected screen is detected at operation 303, then the controller 160 may proceed to operation 305 at which the controller 160 determines whether the size of the projected screen image is decreased. For example, when the size of the projected screen image is decreased because a distance interval between the electronic device 100 and the projected screen image is decreased, the controller 160 may detect the decrease in the size of the projected screen image.

If the controller 160 determines that the size of the projected screen image is decreased at operation 305, then the controller 160 may proceed to operation 307 at which the controller 160 may display a combined screen image in proportion to the size of the decreased screen image. For example, the controller 160 may adjust the combined screen image to have the number of screen images proportional to the size of the decreased screen image and output the adjusted combined screen image on the projected screen image.

Figure 4C:
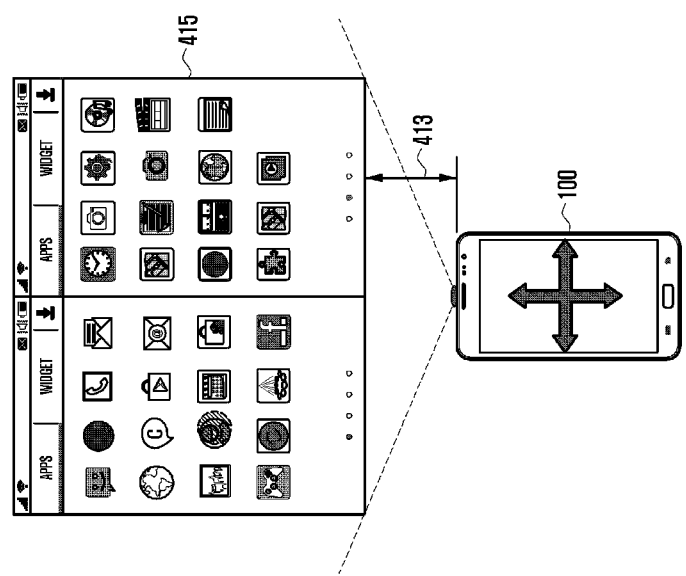

For example, when a distance interval between the electronic device 100 and the projected screen image is decreased from distance 409 of FIG. 4B to distance 413 of FIG. 4C, a size of the projected screen image may also be decreased from reference numeral 411 of FIG. 4B to reference numeral 415 of FIG. 4C. The controller 160 may adjust the number of screen images proportional to the size of the decreased projected screen image from three (screen images 401, 403, and 405) to two (screen images 401 and 403) and output the adjusted two screen images 401 and 403 as a combined screen image on the projected screen image. When the combined screen image 415 is adjusted to include the two screen images 401 and 403 is displayed, and the controller 160 detects the decrease in the distance interval between the electronic device 100 and the projected screen image, the controller 160 controls sizes of icons to be gradually decreased and displayed in the screen image 411 in which the three screen images 401, 403, and 405 are combined, and when the sizes of the icons are decreased to a predetermined size, the controller 160 may control the combined screen image 415, in which one screen image 405 is decreased and the two screen images 401 and 403 are combined, to be displayed.

In contrast, if the controller 160 determines that the size of the projected screen image is not decreased at operation 305, then the controller 160 may proceed to operation 309 at which the controller 260 determines whether the size of the projected screen image is increased. For example, when the size of the projected screen image is increased because the distance interval between the electronic device 100 and the projected screen image is increased, the controller 160 may detect the increase in the size of the projected screen image.

If the controller 160 determines that the size of the projected image is increased at operation 309, then the controller 160 may proceed to operation 311 at which the controller 160 displays a combined screen image in proportion to size of the increased screen image. For example, the controller 160 may adjust the combined screen image to have the number of screen images proportional to the size of the increased screen image and output the adjusted combined screen image on the projected screen image.

For example, when the distance interval between the electronic device 100 and the projected screen image is increased from distance 409 of FIG. 4B to distance 417 of FIG. 4D, a size of the projected screen image may also be increased from reference numeral 411 of FIG. 4B to reference numeral 419 of FIG. 4D. The controller 160 may adjust the number of screen images proportional to the size of the increased projected screen image from three (screen images 401, 403, and 405) to four (screen images 401, 403, 405, and 407) and output the adjusted four screen images 401, 403, 405, and 407 as a combined screen image 419 on the projected screen image.

According to various embodiments of the present disclosure, the combined screen image 419 adjusted to include the four screen images 401, 403, 405, and 407 is displayed, and the controller 160 detects the increase in the distance interval between the electronic device 100 and the projected screen image, the controller 160 controls sizes of icons to be gradually increased and displayed on the screen image 411 in which the three screen images 401, 403, and 405 are combined, and when the sizes of the icons are decreased to a predetermined size, the controller 160 may control the combined screen image 419, in which one screen image 407 is increased and the four screen images 401, 403, 405, and 407 are combined, to be displayed.

When the movement of the electronic device 100 is not detected through the sensor unit 140 at operation 303, the controller 160 returns to and performs operation 207 of FIG. 2.

Referring to FIG. 2, the controller 160 may determine whether a touch input is detected through the touch panel 132. An operation (e.g., screen image movement, execution of application, deletion of application, and/or the like) of the cursor on the projected screen image may be controlled in response to the detected touch input. At operation 207, the controller 160 determines whether a touch input is detected. For example, when the touch input is generated through the touch panel 132, the controller 160 detects the generation of the touch input.

If the controller 160 determines that a touch input is not detected at operation 207, then the controller 160 may return to operation 205.

In contrast, if the controller 160 determines that a touch input is detected at operation 207, then the controller 160 may proceed to operation 209 at which the controller 160 analyzes the touch input. The controller 160 may determine whether the analyzed touch input is a touch input for the screen image movement or a touch input for execution of an application.

Detailed performance steps of operations 211 to 217 of FIG. 2 will be described in detail with reference to FIGS. 5A to 5G.

FIGS. 5A, 5B, 5C, 5D, 5E, 5F, and 5G are diagrams of an example for describing a method of performing a function in response to a touch input according to various embodiment of the present disclosure.

Referring to FIGS. 5A, 5B, 5C, 5D, 5E, 5F, and 5G, at operation 211, the controller 160 may determine whether the touch input corresponds to a screen image movement. For example, when the analyzed touch input is a touch input for the screen image movement, the controller 160 may detect that the analyzed touch input is the touch input for the screen image movement.

If the controller 160 determines that the touch input corresponds to a screen image movement at operation 211, then the controller 160 may proceed to operation 213 at which the controller 160 displays the connected screen image. For example, the controller 160 may control a screen image connected to the screen image to be displayed on the projected screen image. The display of the connected screen image may include a display of a moved screen image by moving the output screen image to a previous screen image or a next screen image connected to the output screen image (e.g., the application screen image and/or the home screen image), or a display of a screen image by changing the output screen image.

Figure 5A:
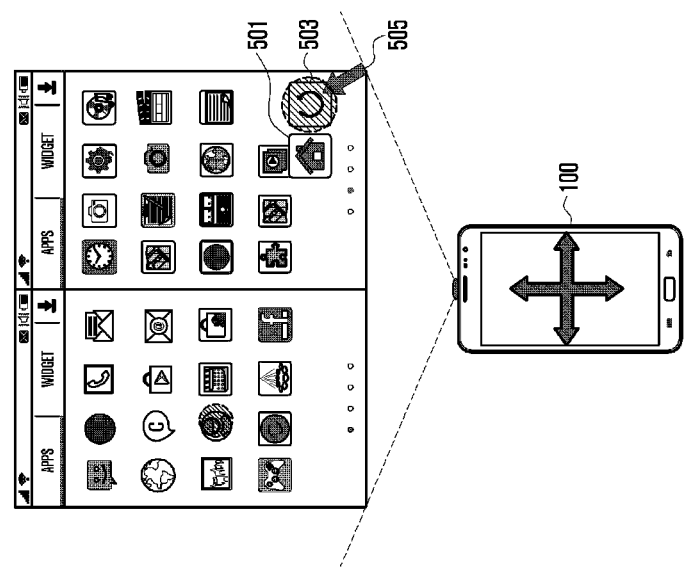
Figure 5B:
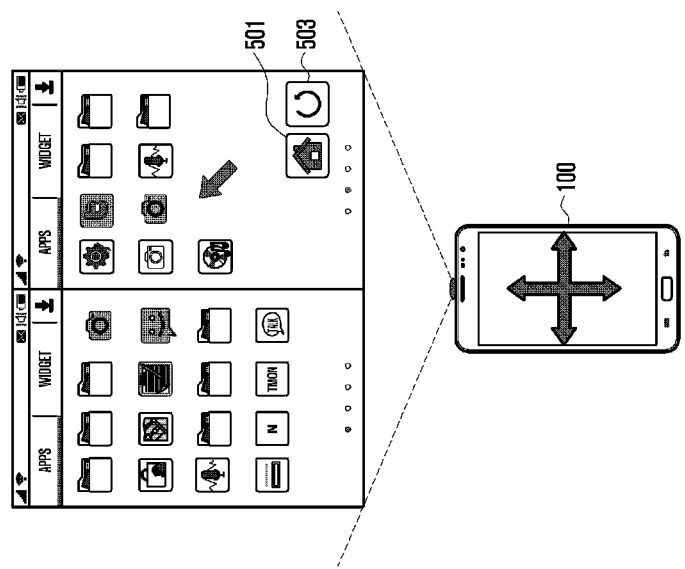

For example, when the application screen image includes the four screen images 401, 403, 405, and 407 of FIG. 4A as described above, the display of the moved screen image may be set to combine and display the two screen images 401 and 403 in proportion to a distance as illustrated in FIG. 5A. When a touch input is generated in a screen movement icon 503 by controlling a cursor 505 through the touch panel 132 in the screen image in which the two screen images 401 and 403 are combined, the controller 160 may control the two screen images 405 and 407 non-displayed in FIG. 5A to be combined and displayed as illustrated in FIG. 5B.

Figure 5D:
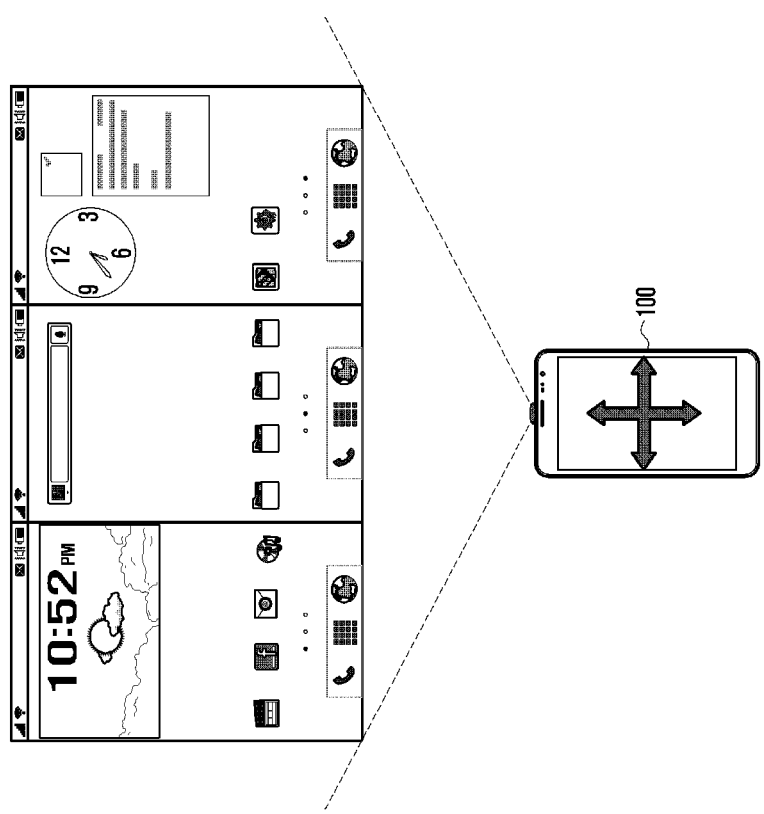

Further, the display of the screen image by changing the screen image may control the application screen image to be changed to the home screen image when the screen image is the application screen image and the home screen image to be displayed, and control the home screen image to be changed to the application screen image when the screen image is the home screen image and the application screen image to be displayed. For example, when a touch input is generated in a screen image change icon 501 by controlling the cursor 505 through the touch panel 132 in the application combined screen image as illustrated in FIG. 5C, the controller 160 may change the application screen image to the home screen image and display the changed home screen image as illustrated in FIG. 5D. Otherwise, when a touch input is generated in the screen image change icon by controlling the cursor 505 through the touch panel 132 in the home screen image as illustrated in FIG. 5D, the controller 160 may change the home screen image to the application screen image and display the changed application screen image as illustrated in FIG. 5C.

If the controller 160 determines that the touch input does not correspond to a screen image movement at operation 211, then the controller 160 may proceed to operation 215 at which the controller 160 may determine whether the touch input corresponds to an input for executing an application. For example, the analyzed touch input is not the touch input for the screen image movement, the controller 160 may determine whether the analyzed touch input is a touch input for the execution of an application.

If the controller 160 determines that the touch input corresponds to an input for executing an application at operation 215, then the controller 160 may proceed to operation 217 at which the controller 160 displays an application execution screen image on a corresponding screen image. For example, when the analyzed touch input is the touch input for the execution of an application, the controller 160 may detect that the analyzed touch input is the touch input for the execution of the application, and may display an application execution screen image on a corresponding screen image.

Figure 5E:
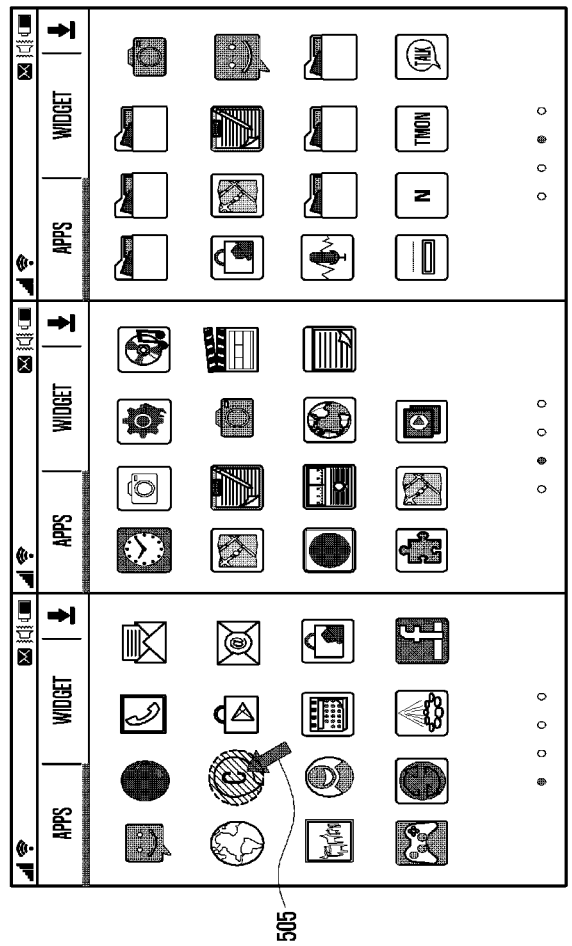
Figure 5F:
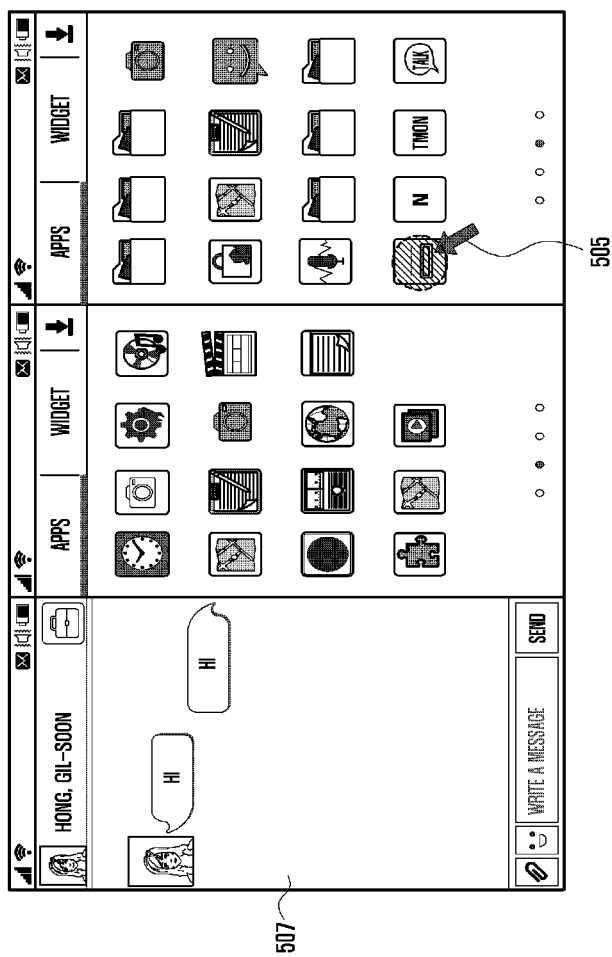

For example, referring to FIG. 5E, when a chatting application located in screen image 1 401 is executed by controlling the cursor 505 through the touch panel 132 in a screen image, a chatting application execution screen image may be displayed on screen image 1 401 as denoted by reference numeral 507 of FIG. 5F. Thereafter, when an Internet application located in screen image 3 405 is executed by controlling the cursor 505 through the touch panel 132 in a screen image of FIG. 5F, an Internet application execution screen image may be displayed on screen image 3 405 as denoted by reference numeral 509 of FIG. 5G. For example, when a touch input for executing the application is generated, the controller 160 may control the application execution screen image to be displayed on a corresponding screen image as denoted by reference numerals 507 and 509 of FIG. 5G.

In contrast, if the controller 160 determines that the touch input does not correspond to an input for executing an application at operation 215, then the controller 160 may proceed to operation 219 at which the controller 160 performs a corresponding function. For example, when the analyzed touch input is not the touch input for the screen image movement and the application execution movement, the controller 160 may perform a corresponding function in operation 219. The corresponding function may be a touch input for an application movement, application deletion, and the like.

Thereafter, the controller 160 may proceed to operation 221 at which the controller 160 may control whether the projector application is terminated. When the projector application is terminated, the controller 160 detects the termination of the projector application and terminates the projector application.

In contrast, when the termination of the projector application is not detected at operation 221, the controller 160 may return to operation 205.

In the above description, the method and the apparatus for outputting a screen image in the electronic device according to the present disclosure has been described based on the various embodiments through the present specification and drawings, and the specific terms are used, but are used as the general means for easily describing technical contents of the present disclosure and helping understanding of the present disclosure, and the present disclosure is not limited to the aforementioned embodiment of the present disclosure.

It will be appreciated that various embodiments of the present disclosure according to the claims and description in the specification can be realized in the form of hardware, software or a combination of hardware and software.

Any such software may be stored in a non-transitory computer readable storage medium. The non-transitory computer readable storage medium stores one or more programs (software modules), the one or more programs comprising instructions, which when executed by one or more processors in an electronic device, cause the electronic device to perform a method of the present disclosure.

Any such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disk (CD), Digital Versatile Disc (DVD), magnetic disk or magnetic tape or the like. It will be appreciated that the storage devices and storage media are various embodiments of non-transitory machine-readable storage that are suitable for storing a program or programs comprising instructions that, when executed, implement various embodiments of the present disclosure. Accordingly, various embodiments provide a program comprising code for implementing apparatus or a method as claimed in any one of the claims of this specification and a non-transitory machine-readable storage storing such a program.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of outputting a screen image in an electronic device, the method comprising:
   outputting a screen image of an electronic device as a projected screen image through a projector when a projector application is executed;
   measuring a distance between the electronic device and the projected screen image; and
   generating a combined screen image by setting the number of screen images to be displayed according to the measured distance, and then outputting the combined screen image on the projected screen image through the projector,
   wherein the combined screen image further displays a screen image change icon including a home screen image change icon and an application screen image change icon, and
   wherein the displaying of the screen image change icon includes at least one of:
      displaying the home screen image change icon when the combined screen image is an application combined screen image, changing the application combined screen image to a home combined screen image and displaying the home combined screen image in response to selection of the home screen image change icon, and displaying the application screen image change icon when the combined screen image is a home combined screen image, changing the home combined screen image to the application combined screen image, and displaying the application combined screen image in response to selection of the application screen image change icon.

2. The method of claim 1, wherein the measuring of the distance includes measuring a distance between the electronic device and the first projected screen image by using a distance detection sensor during a use of the projector.

3. The method of claim 1, wherein the outputting of the combined screen image includes:
setting a size of the projected screen image displayed according to the measured distance between the electronic device and the projected screen image;
determining the number of screen images displayable according to the size of the projected screen image; and
generating a combined screen image with the number of screen images including a screen image of the electronic device, and outputting the generated combined screen image on the projected screen image through the projector.

4. The method of claim 3, wherein the outputting of the combined screen image further includes:
detecting the size of the projected screen image according to a distance between the electronic device and the projected screen image when a movement of the electronic device is detected;
adjusting the combined screen image to have the number of screen images proportional to the size of the decreased screen image when the size of the projected screen image is decreased, and displaying the adjusted combined screen image; and
adjusting the combined screen image to have the number of screen images proportional to the size of the increased screen image when the size of the projected screen image is increased, and displaying the adjusted combined screen image.

5. The method of claim 4, wherein the outputting of the combined screen image further includes:
driving a touch panel of the electronic device as a touch pad in which a touch input for controlling the combined screen image is generated.

6. The method of claim 1, wherein the combined screen image further displays a screen image movement icon.

7. The method of claim 6, further comprising:
in response to selection of the screen image movement icon, displaying a screen image connected to the combined screen image that is displayed.

8. The method of claim 1, further comprising:
in response to detection of a touch input for executing an application in the combined screen image, displaying an application execution screen image on a corresponding screen image.

9. An apparatus for outputting a screen image in an electronic device, the apparatus comprising:
a projector configured to output a screen image supported by the electronic device a projected screen image;
a touch panel driven as a touch pad generating a touch input for controlling the output combined screen image; and
a controller configured to:
output the screen image of the electronic device on a projected screen image through the projector when a projector application is executed,
measure a distance between the electronic device and the projected screen image, and
set the number of screen images to be displayed according to the measured distance and
control the set number of screen images to be output as a combined screen image on the projected screen image,
wherein the controller is further configured to:
display a screen image change icon including a home screen image change icon and an application screen image change icon to on the combined screen image, when the combined screen image is an application combined screen image,
display the home screen image change icon, and
change the application combined screen image to a home combined screen image and control the home combined screen image to be displayed in response to selection of the home screen image change icon, and
wherein, the controller is further configured to, when the combined screen image is a home combined screen image:
display the application screen image change icon, and
change the home combined screen image to the application combined screen image and control the application combined screen image to be displayed in response to selection of the application screen image change icon.

10. The apparatus of claim 9,
wherein the controller is further configured to measure the distance between the electronic device and the projected screen image by using a distance detection sensor when using the projector.

11. The apparatus of claim 10, wherein the controller is further configured to:
set a size of the projected screen image displayed according to the measured distance between the electronic device and the projected screen image,
determine the number of screen images displayable according to the size of the projected screen image,
generate a combined screen image with the number of screen images including the screen image of the electronic device, and
output the generated combined screen image on the projected screen image through the projector.

12. The apparatus of claim 11, wherein the controller is further configured to:
detect a size of the projected screen image according to the distance between the electronic device and the projected screen image when a movement of the electronic device is detected,
adjust the combined screen image to have the number of screen images proportional to a size of the decreased screen image and the adjusted combined screen image to be displayed when the size of the projected screen image is decreased, and
adjust the combined screen image to have the number of screen images proportional to a size of the increased screen image and the adjusted combined screen image to be displayed when the size of the projected screen image is increased.

13. The apparatus of claim 9, wherein the controller is further configured to display a screen image movement icon on the combined screen image.

14. The apparatus of claim 13, wherein the controller is further configured to:

control a new screen image, which is not displayed on the projected screen image, to be displayed as a combined screen image in response to detection of a touch input into the screen image movement icon.

15. The apparatus of claim 9, wherein the controller is further configured to:
control an application execution screen image to be displayed on a corresponding screen image in response to detection of a touch input for executing the application in the combined screen image.

* * * * *